United States Patent [19]

Jones

[11] 3,975,363

[45] Aug. 17, 1976

[54] POLY(DIELS-ALDER) POLYMER

[75] Inventor: Robert J. Jones, Hermosa Beach, Calif.

[73] Assignee: TRW Inc., Redondo Beach, Calif.

[22] Filed: Feb. 14, 1975

[21] Appl. No.: 550,080

Related U.S. Application Data

[63] Continuation of Ser. No. 411,515, Oct. 31, 1973, abandoned.

[52] U.S. Cl. ............................ 260/47 UA; 260/37 N; 260/47 CZ; 260/47 CP; 260/49; 260/63 R; 260/65; 260/78 P; 260/78 UA; 260/78 TF; 260/78 SC; 260/857 R
[51] Int. Cl.$^2$ ................ C08G 69/48; C08G 73/12
[58] Field of Search ......... 260/47 CP, 78 TF, 47 CZ, 260/63 N, 49, 78 UA, 47 UA, 63 R, 65, 78 R, 78 SC, 857 R

[56] References Cited
UNITED STATES PATENTS

| | | | |
|---|---|---|---|
| 3,717,615 | 2/1973 | Holub et al. ......................... | 260/78 |
| 3,748,311 | 7/1973 | Burns et al. ......................... | 260/78.4 |
| 3,767,626 | 10/1973 | Laurent et al. ..................... | 260/78 |

*Primary Examiner*—Lester L. Lee
*Attorney, Agent, or Firm*—Daniel T. Anderson; Alan D. Akers; Willie Krawitz

[57] ABSTRACT

Linear polymers are produced by the reaction of an olefinic end-capped bis(imide) or bis(amide) compound, i.e. a dieneophile with a furfuryl or furan end-capped bis(imide) or bis(amide) compound, i.e. a diene. These linear polymers have an alicyclic endoxy linkage repeated throughout the polymer backbone chain where the furfuryl end-cap combines with the olefin end-cap by Diels-Alder reaction. The linear polymer is converted to a higher performance polymer by heating in the range of 200° to 400°C whereupon the endoxy linkage is aromatized in situ. The resins so prepared are suitable for use in severe environments at temperatures up to 350°C.

2 Claims, No Drawings

POLY(DIELS-ALDER) POLYMER

This application is a continuation of Ser. No. 411,515, filed Oct. 31, 1973, and now abandoned.

BACKGROUND OF THE INVENTION

Polymers made from a Diels-Alder reaction are briefly described in the art. U.S. Pat. No. 3,334,071 teaches the formation of polyimides from dimaleimides and bis(fulvenes). An aliphatic or aromatic compound is end-capped with a maleimide radical which reacts with a fulvene end-capped compound to produce an alicyclic endomethylene linkage in the polymer backbone chain.

U.S. Pat. No. 2,971,944 teaches the preparation of maleimide polymers by the Diels-Alder reaction of a N,N'-bis(maleimide) with a thiophene dioxide to produce a monomeric adduct which can then be homopolymerized. During the Diels-Alder reaction of the thiophene dioxide with the bis(maleimide), sulfur dioxide is evolved prior to the polymerization reaction.

U.S. Pat. No. 3,074,915 teaches a similar polymeric reaction, however, in place of the thiophene dioxide, a substituted alpha-pyrone is used. Upon reaction of the substituted alpha-pyrone with the bis(maleimide), to produce the monomeric Diels-Alder adduct, carbon dioxide is given off.

U.S. Pat. No. 2,890,206 teaches a maleimide polymer produced by the polymerization of a Diels-Alder adduct which is produced by the reaction of an N,N'-bis(maleimide) with a cyclopentadieneone. The Diels-Alder adduct contains an endocarbonyl bridge which is destroyed by heating above about 150°C. The resulting adduct is then polymerized.

SUMMARY OF THE INVENTION

High performance polymers are produced by the in situ aromatization of a linear polymer having alicyclic endooxy linkages in the backbone chain. The linear polymer is produced, for example, by the reaction of a furfuryl end-capped bis(imide) with an olefinic end-capped bis(imide) according to the following:

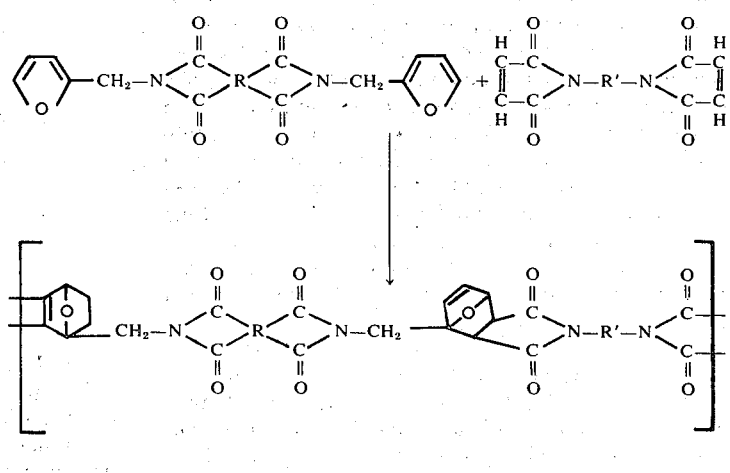

where R is a tetrafunctional aromatic radical and R' is a difunctional aromatic radical.

The intermediate linear polymer containing the endooxy bridge provides a structure having a low melting point which permits easier processability prior to final cure by aromatization. Upon subsequent fabrication, the polymer is heated to aromatize the endooxy bridge as follows:

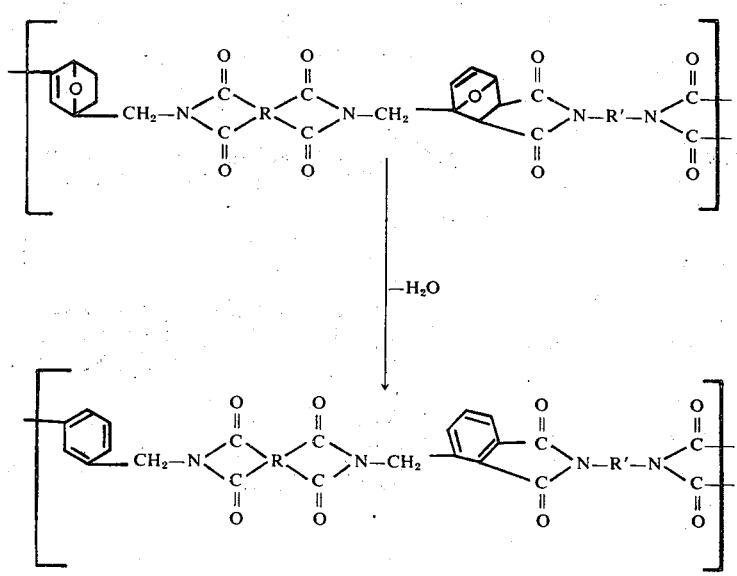

Comparable reactions can be performed with bis(amides).

The polymeric compositions described herein offer an economic advantage over prior resin materials prepared by a Diels-Alder reaction in that low cost ingredients are used. In addition, water, a nontoxic by-product, is evolved in the aromatization reaction to give low void content. Articles suitable for use at temperatures up to 350°C in air may be prepared using glass or graphite fiber reinforced composites, adhesive bonded structures, coatings and molded parts utilizing autoclave or press molding techniques at temperatures down to 150°C and pressures as low as 15 psi.

DESCRIPTION OF THE PREFERRED EMBODIMENTS

Linear polymers having outstanding performance characteristics are produced by the polymeric reaction of a difurfuryl end-capped monomer and a diolefin end-capped monomer. The reaction between the end-caps produces an alicyclic endooxy linkage in the polymer chain which gives good solubility and fabrication characteristics to the intermediate polymer. Upon fabrication to the final product, heat is applied which results in the in situ aromatization of the alicyclic linkages and the accompanying loss of water. The resulting aromatized polymer has improved performance characteristics manifested by reduced solubility, improved chemical and thermal stability, and improved physical strength.

Two monomers used for the synthesis of the polymers in the present invention may be selected from either bis(furfuryl)amide or bis(furfuryl)imide. Neither monomer is commercially available, however, both can be made using standard procedures reacting the following compounds. The bis(furfuryl)amides may be synthesized by reacting one mole of an organic diacid or derivative thereof with two moles of furfuryl amine. The reaction may be illustrated as follows:

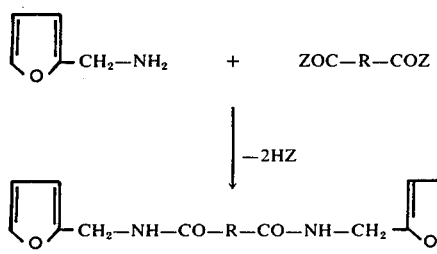

where R is a difunctional aromatic, cycloaliphatic, or aliphatic radical and Z may be —Cl, —Br, —I, —OR, or —O₂CR. The bis(furfuryl)imide may be synthesized by reacting one mole of furfuryl amine. The reaction may be illustrated as follows:

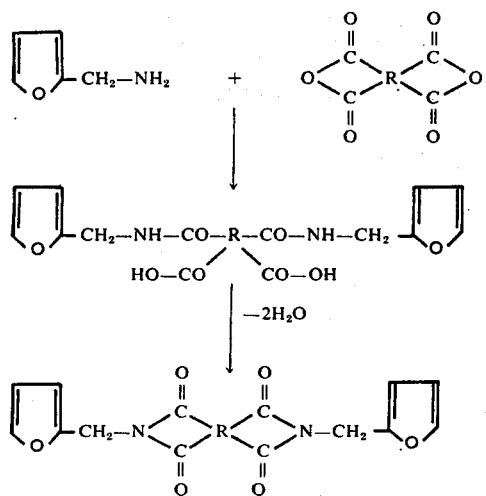

where R is a tetrafunctional aromatic radical.

The polymerization process is initiated by mixing equal molar equivalents of an aromatic bis(imide) or bis(amide) having two furfuryl end-cap groups with an aromatic bis(imide) or bis(amide) having two olefin end-cap groups. The olefin and furfuryl end-cap groups react at room temperature to produce a polymer having recurring alicyclic endooxy linkages according to the following reaction:

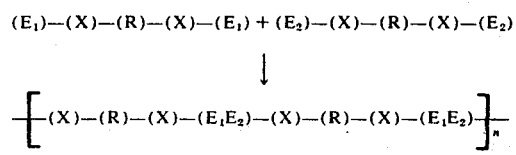

where R may be any of the following di- or tetrafunctional radicals:

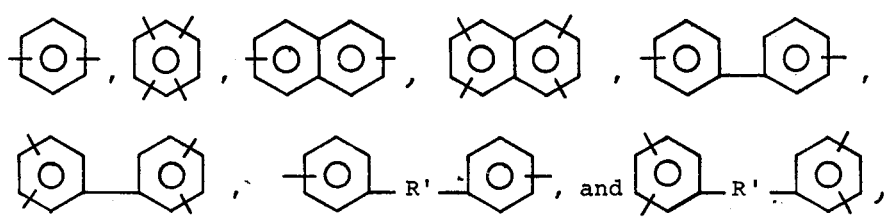

wherein R' is —O—, —S—, —SO$_2$—, —CO—, —CH$_2$—, —C$_2$H$_4$—, —C$_3$H$_6$—,

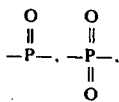

and

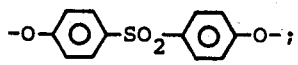

X may be either —NH—CO— or

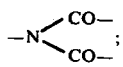

E$_1$E$_2$ is either

or

and *n* is an integer between 3 and 100. After fabrication of the polymer to the final product configuration, the polymer is subjected to a thermal cure cycle which aromatizes the alicyclic endooxy linkage, according to the following reaction:

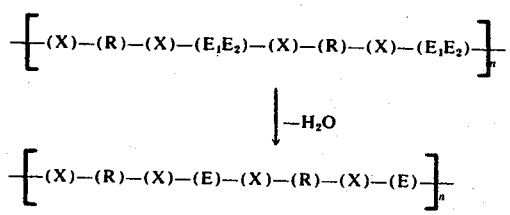

where X, *n*, and R have been defined previously, and E is either

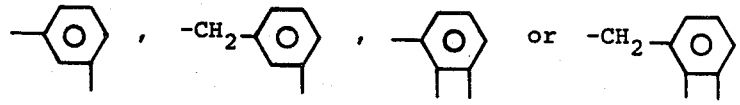

The initial polymerization reaction may be effected at or near room temperature. However, the preferred temperature range is from 100°C to 250°C. In either instance, the polymerization reaction will be completed in 24 to 48 hours. It should be understood that parameters such as the viscosity and mass of the reactants will affect the polymerization time, also.

The in situ aromatization is normally effected in a temperature range of between 200°C and 400°C. The aromatized reaction involves the same mechanism regardless of the constituents between the alicyclic endooxy linkages, and therefore, the time and temperature relationships required remain substantially constant. However, where high molecular weight reactants as contrasted to low molecular weight reactants are used, significantly different times and temperatures of reaction may be expected.

Although it is not critical, solvents may be used to reduce the viscosity of the reactants and facilitate mixing and fabrication. Generally, any of the more common solvents can be used, e.g., benzene, acetone, dimethylformamide, toluene, cyclohexane, pyridine, butyrolactone, dimethylsulfoxide, or N-methyl-2-pyrrolidine.

The invention will be more clearly understood by referring to the following examples. These examples illustrate specific embodiments and should not be construed as limiting the invention.

EXAMPLE I

Polymerization of Bis(4-furfuryl) Benzophenone Tetracarboxylic Imide/Bis(4-maleimido phenyl) Methane A 5.01 g sample of a 1:1 molar mixture of bis(4-furfuryl) benzophenone tetracarboxylic imide (2.87 g) and bis(4-maleimido phenyl) methane (2.14g) was heated for 2 hours at 232°C under a nitrogen atmosphere pressurized to 200 psig. The resulting consolidated polymer sample then was postcured under a nitrogen blanket employing a 4 hour linear heat-up cycle from 204°C to 316°C followed by a 2 hour isothermal cycle at 316°C. The resulting polymer displayed excellent 1,000 hour stability in air at 288°C.

EXAMPLE II

Polymerization of Bis(2-furfuryl) Pyromellitimide/Bis(4-maleimido phenyl) Methane A 5.03 g sample of 1:1 molar mixture of bis(2-furfuryl) pyromellitimide (2.57 g) and bis(4-maleimido phenyl) methane (2.45 g) was polymerized and postcured as in the example above.

I claim:

1. An aromatic polymer consisting essentially of the structure:

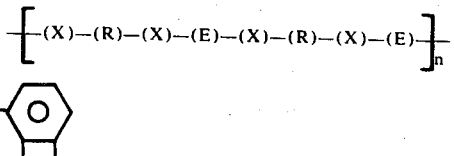

wherein R is an aromatic radical selected from the group consisting of difunctional radicals having the structure:

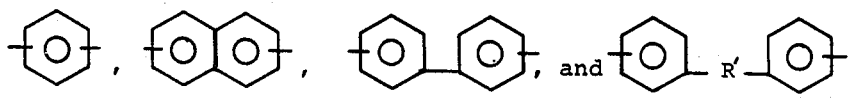

and tetrafunctional radicals having the structure:

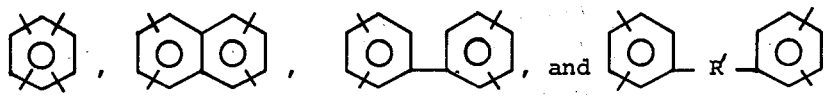

wherein R' is —O—, —S—, —SO$_2$—, —CO—, —CH$_2$—, —C$_2$H$_4$—, —C$_3$H$_6$—,

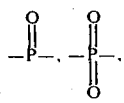

and

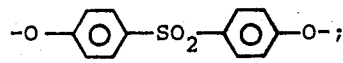

X is selected from the group consisting of —NH—CO— and

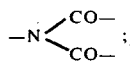

E is selected from the group consisting of

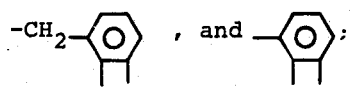

and n is an integer from 3 to 100.

2. A method of making an aromatic polymer comprising:
A. mixing (i) a furfuryl or furan end-capped compound having the structure:

(E$_1$)—(X)—(R)—(X)—(E$_1$)

wherein R is an aromatic radical selected from the group consisting of difunctional radicals having the structure:

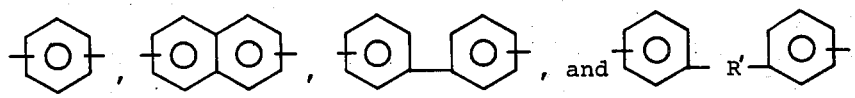

and tetrafunctional radicals having the structure:

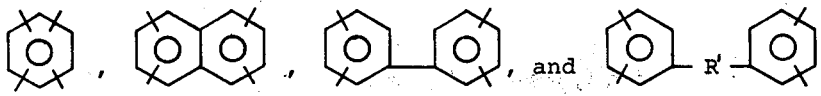

wherein R' is —O—, —S—, —SO$_2$—, —CO—, —CH$_2$—, —C$_2$H$_4$—, —C$_3$H$_6$—,

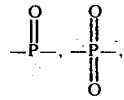

and

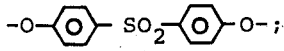

X is selected from the group consisting of —NH—CO— and

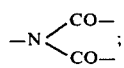

and E$_1$ is selected from the group consisting of

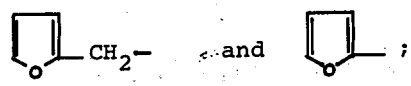

with (ii) an olefinic end-capped compound having the structure: (E$_2$)—(X)—(R)—(X)—(E$_2$)
wherein E$_2$ is selected from the group consisting of CH$_2$=CH— and

to produce a linear aromatic polymer chain by the reaction of E$_1$ with E$_2$, forming an alicyclic endooxy linkage; and
B. heating said linear aromatic polymer to aromatize said alicyclic endooxy linkage.

* * * * *